(12) United States Patent
Harada et al.

(10) Patent No.: US 11,472,009 B2
(45) Date of Patent: Oct. 18, 2022

(54) MANUAL TOOL, AND BIT AND TORQUE SENSOR USED THEREFOR

(71) Applicants: FUJIKIN INCORPORATED, Osaka (JP); Sasada Magnetics and Sensors Laboratory Co., Ltd., Fukuoka (JP)

(72) Inventors: Akihiro Harada, Osaka (JP); Masahiko Ochiishi, Osaka (JP); Tsutomu Shinohara, Osaka (JP); Ichiro Sasada, Fukuoka (JP)

(73) Assignees: FUJIKIN INCORPORATED, Osaka (JP); SASADA MAGNETICS AND SENSORS LABORATORY CO., LTD., Fukuoka (JP)

( * ) Notice: Subject to any disclaimer, the term of this patent is extended or adjusted under 35 U.S.C. 154(b) by 138 days.

(21) Appl. No.: 16/756,704

(22) PCT Filed: Oct. 23, 2018

(86) PCT No.: PCT/JP2018/039345
§ 371 (c)(1),
(2) Date: Apr. 16, 2020

(87) PCT Pub. No.: WO2019/082889
PCT Pub. Date: May 2, 2019

(65) Prior Publication Data
US 2020/0238485 A1    Jul. 30, 2020

(30) Foreign Application Priority Data

Oct. 27, 2017  (JP) .............................. JP2017-208657

(51) Int. Cl.
*B25B 23/142*  (2006.01)
*G01L 5/24*  (2006.01)

(52) U.S. Cl.
CPC .............. *B25B 23/142* (2013.01); *G01L 5/24* (2013.01)

(58) Field of Classification Search
CPC .............. B25B 23/142; B25B 23/1422; B25B 23/1425; B25B 23/1427; B25B 23/145;
(Continued)

(56) References Cited

U.S. PATENT DOCUMENTS 5,970,826 A * 10/1999 Iwinski .................. B25B 13/06
81/124.6
2008/0098863 A1   5/2008 Kaneyama et al.
(Continued)

FOREIGN PATENT DOCUMENTS

CH           709757 A2    12/2015
CN         206216566    *   6/2017
(Continued)

OTHER PUBLICATIONS

International Search Report issued in International Patent Application No. PCT/JP2018/039345, dated Dec. 4, 2018, English translation.
(Continued)

*Primary Examiner* — Robert J Scruggs
(74) *Attorney, Agent, or Firm* — Greenblum & Bernstein, P.L.C.

(57) ABSTRACT

To provide a manual tool excellent in workability and operability and capable of precise tightening torque management, a manual tool includes a grip including a bit holding part that detachably holds a bit, and a torque sensor that is of a magnetostrictive type, and includes a detecting part that is penetrated by the bit held by the bit holding part and surrounds an outer periphery of the bit, the torque sensor is capable of contactlessly detecting a torque acting on the bit, and is detachably provided to the grip. The torque sensor
(Continued)

can be configured to be formed so as to be mountable to the grip with the bit mounted to the bit holding part of the grip.

9 Claims, 18 Drawing Sheets

(58) Field of Classification Search
CPC .............. B25B 23/1453; B25B 23/147; B25B 23/1475; B25B 23/141; B25B 23/14; B25B 13/48; G01L 5/24
See application file for complete search history.

(56) References Cited

U.S. PATENT DOCUMENTS

| | | | | |
|---|---|---|---|---|
| 2010/0122611 | A1* | 5/2010 | Everett | ................... B25B 13/06 81/125 |
| 2012/0031238 | A1* | 2/2012 | Peirce | ................... B25G 1/105 81/58 |

FOREIGN PATENT DOCUMENTS

| | | | |
|---|---|---|---|
| CN | 206216566 U | | 6/2017 |
| JP | 6-167401 | | 6/1994 |
| JP | H06-167401 | * | 6/1994 |
| JP | 2008-110414 | | 5/2008 |
| JP | 2008-256430 | * | 10/2008 |
| JP | 2012-86284 | | 5/2012 |
| JP | 2016-050635 | | 4/2016 |
| JP | 2017-87318 | | 5/2017 |

OTHER PUBLICATIONS

International Preliminary on Report issued in International Patent Application No. PCT/JP2018/039345, dated Apr. 28, 2020, English translation.

Chinese Office Action, Chinese Patent Office, Application No. 201880070256.6, dated Feb. 24, 2021, with English translation.

Chinese Office Action, Chinese Patent Office, Application No. 201880070256.6, dated Oct. 15, 2021.

* cited by examiner

[fig.1]
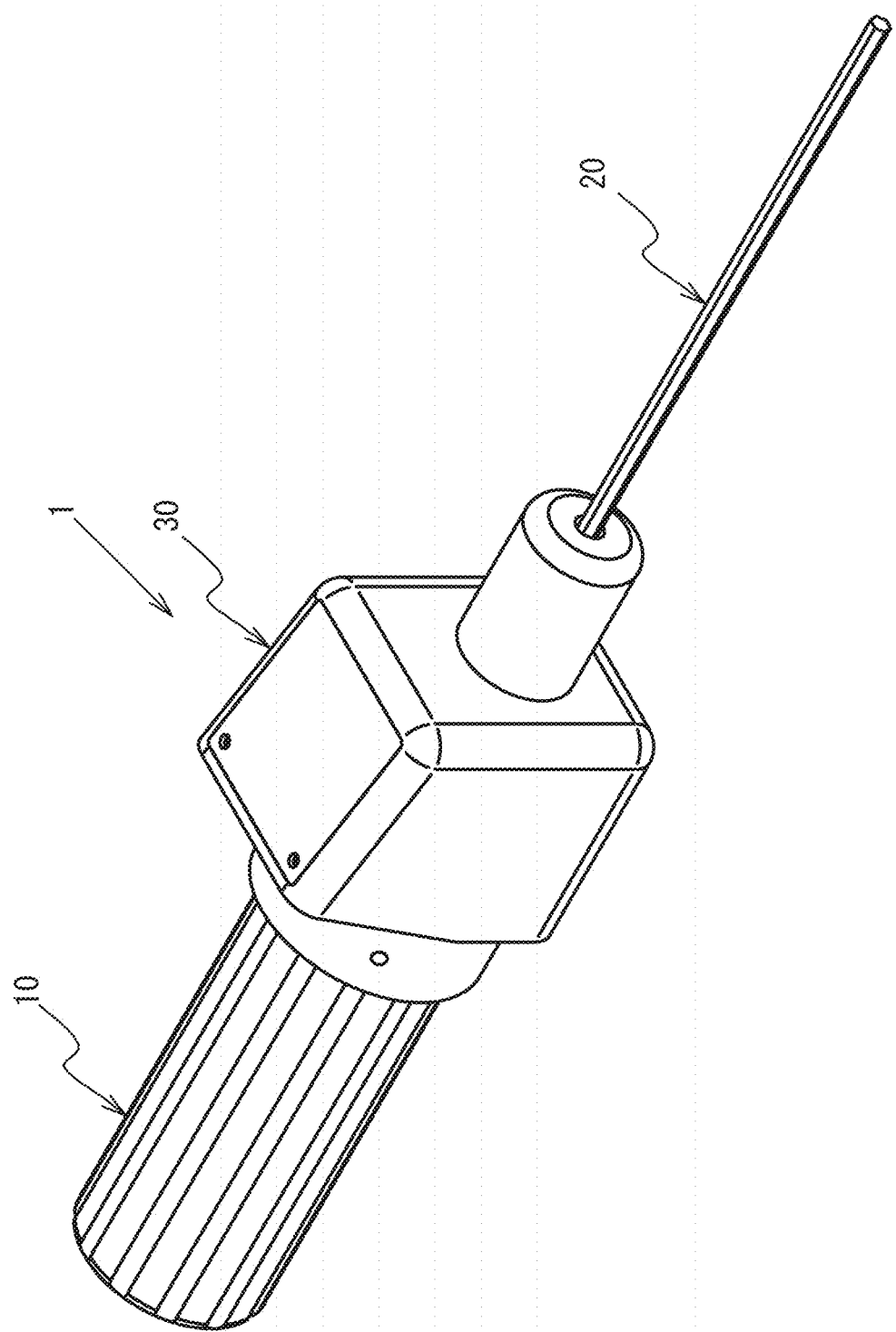

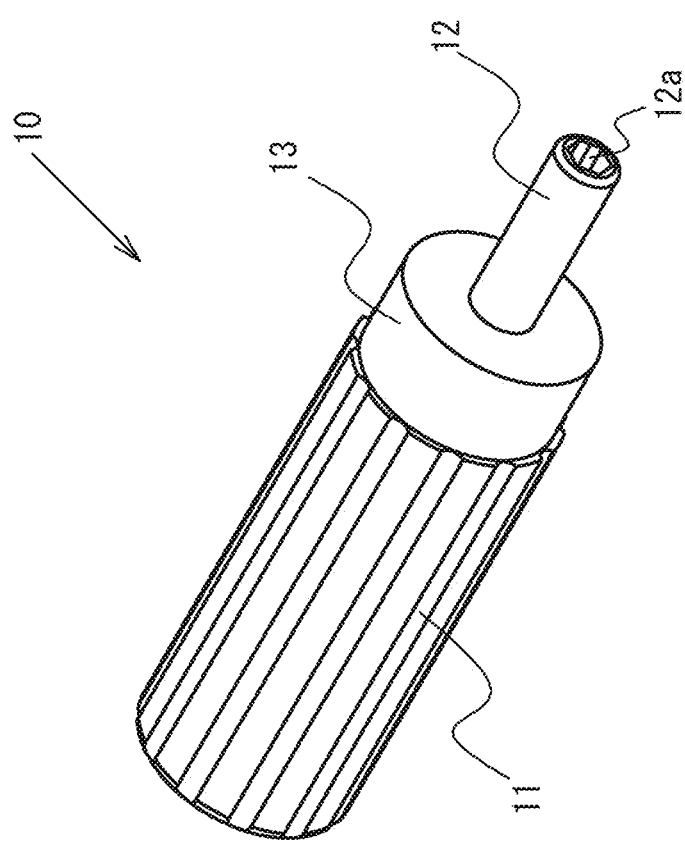

[fig.3]
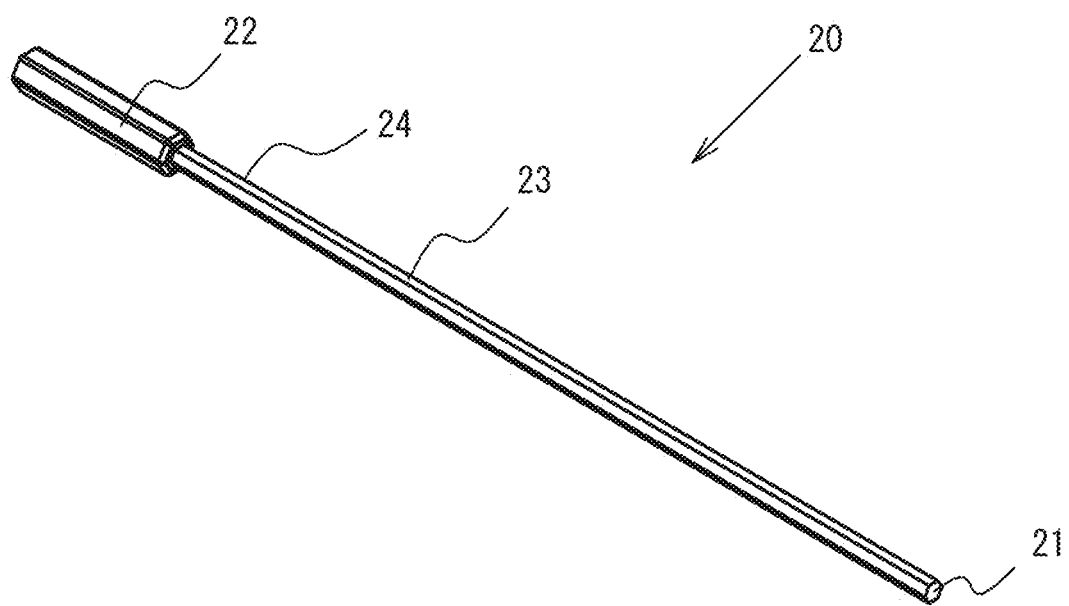

[fig.4]
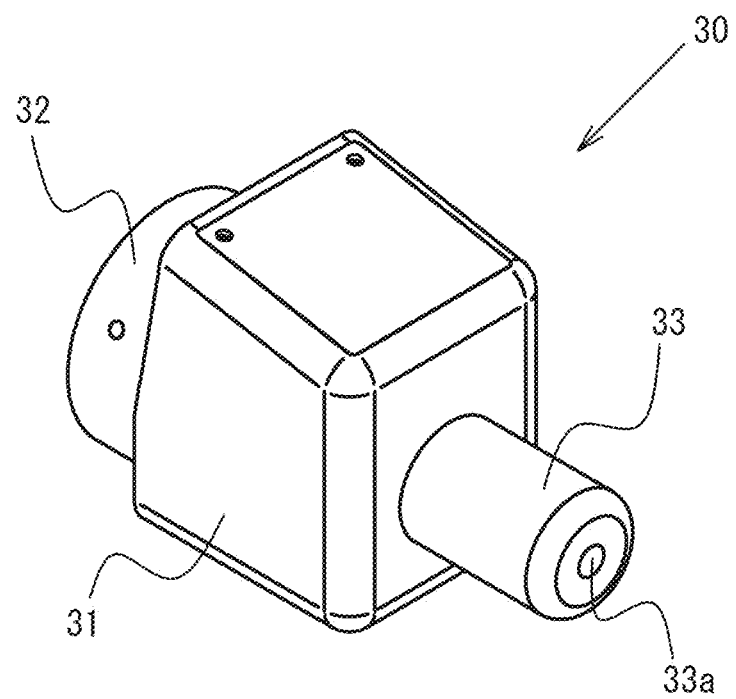

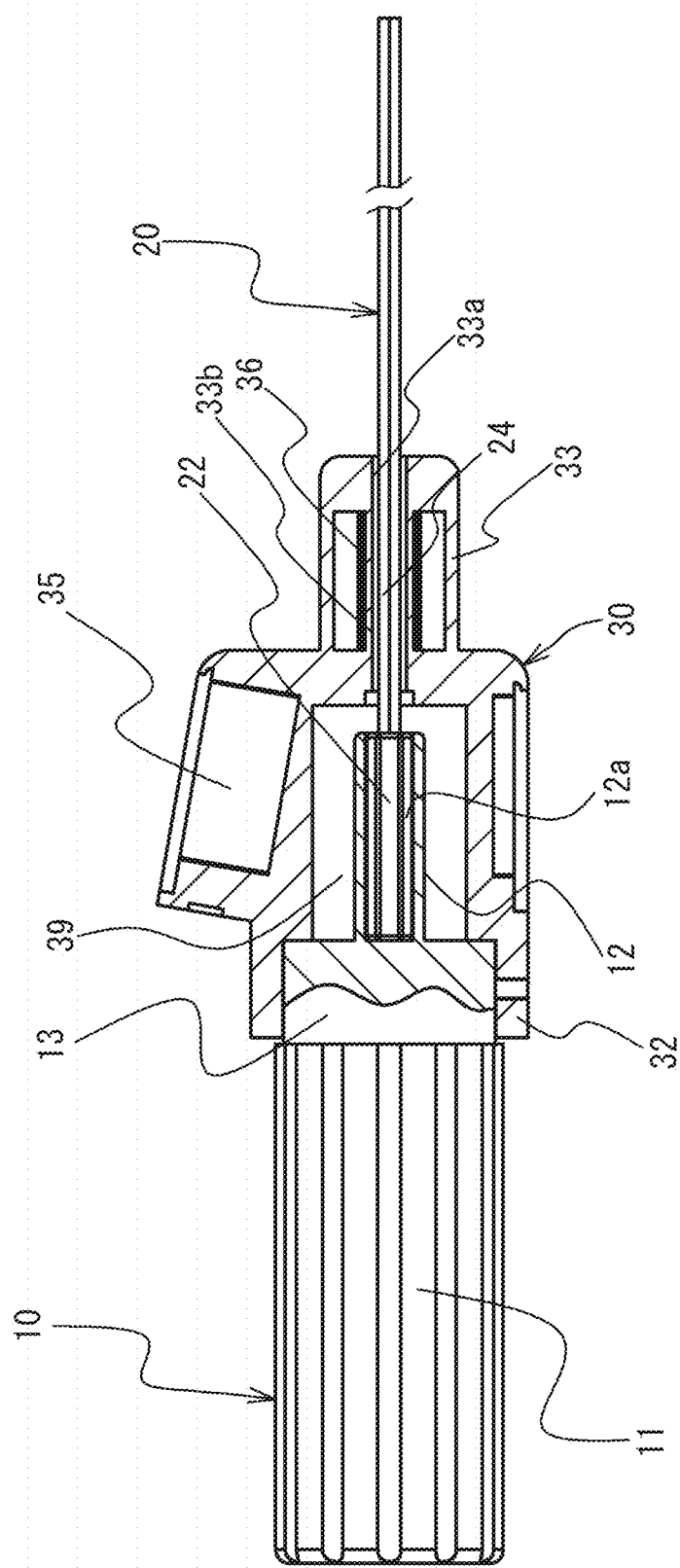

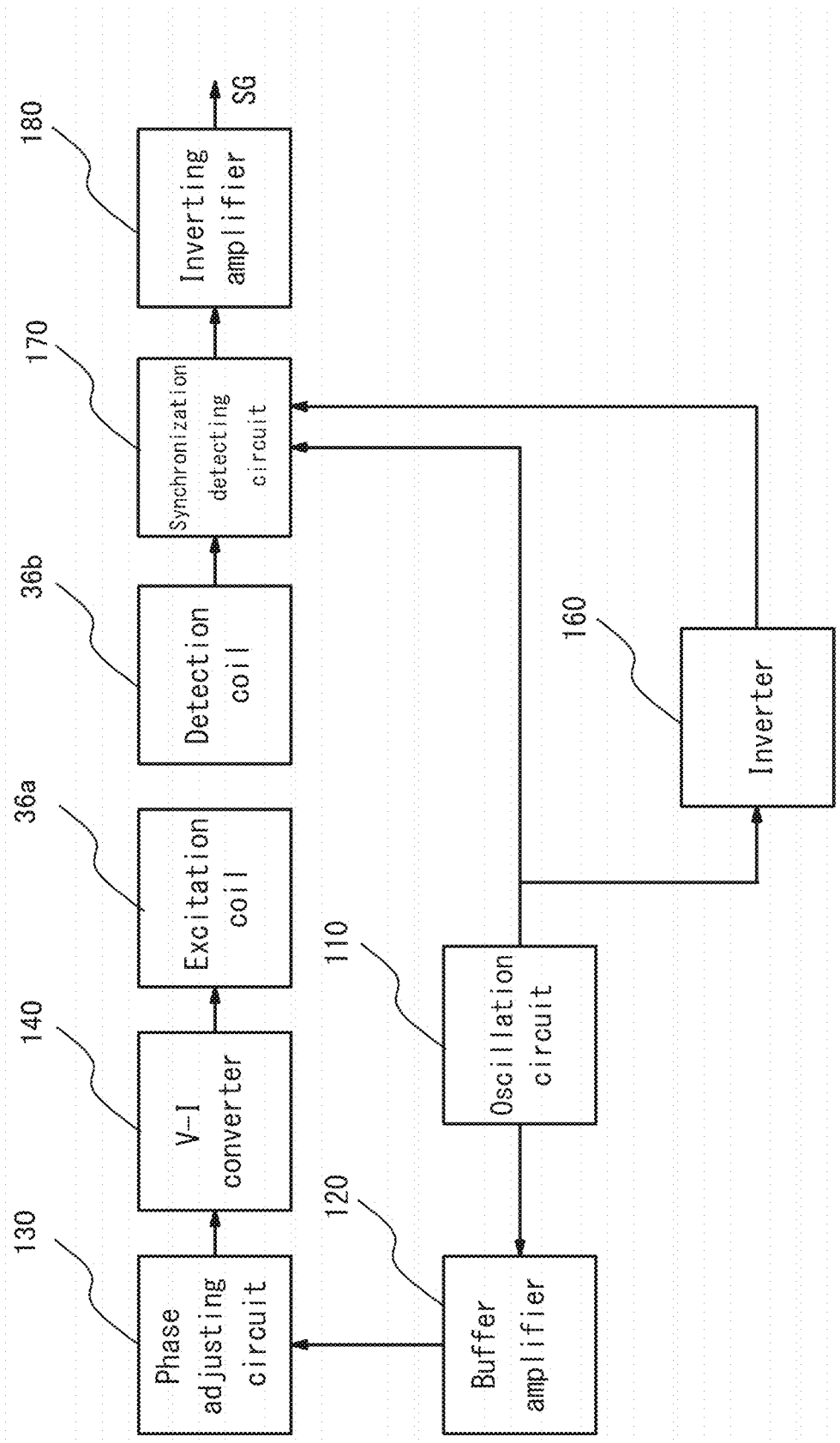
[fig.6]

[fig.7]
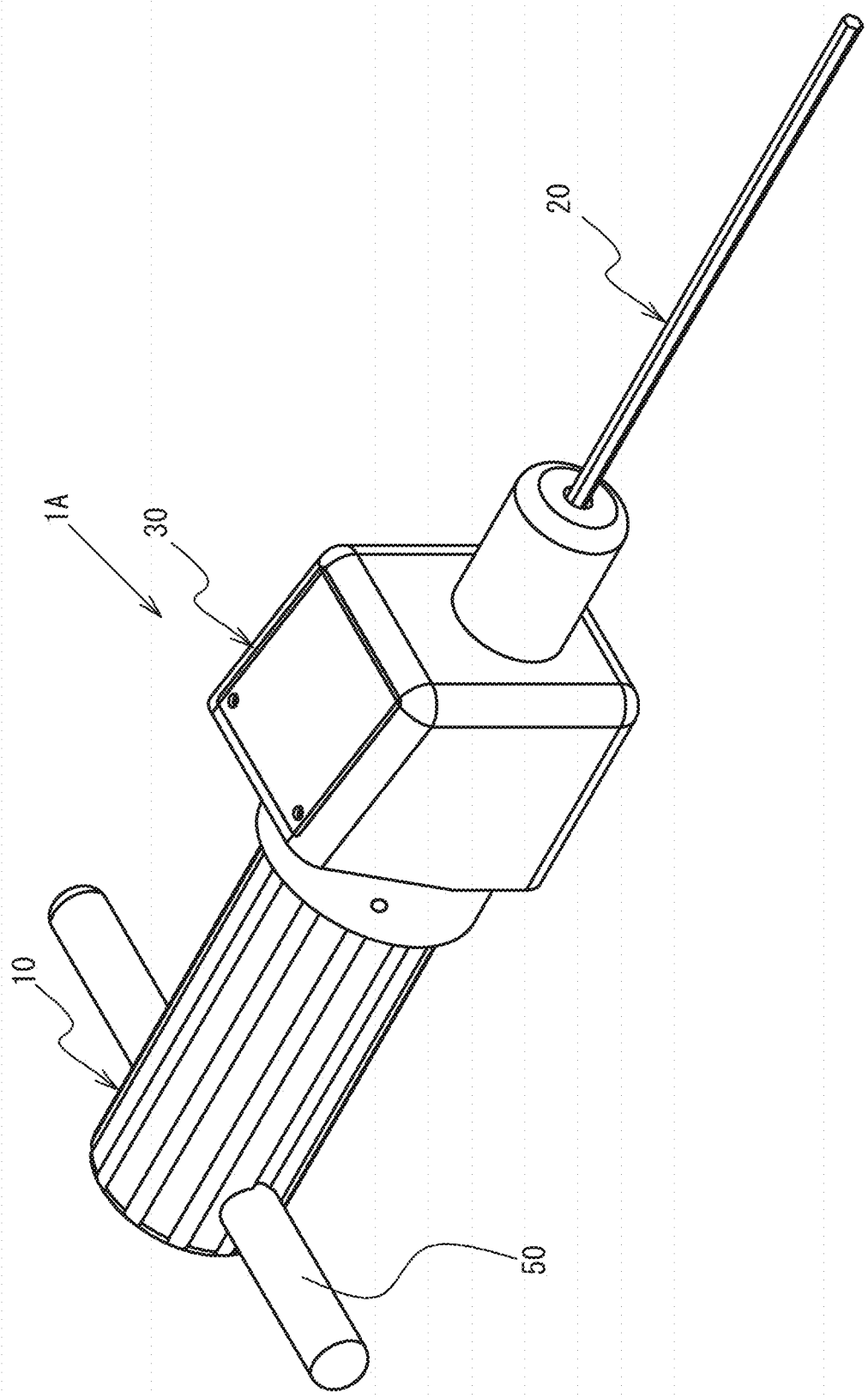

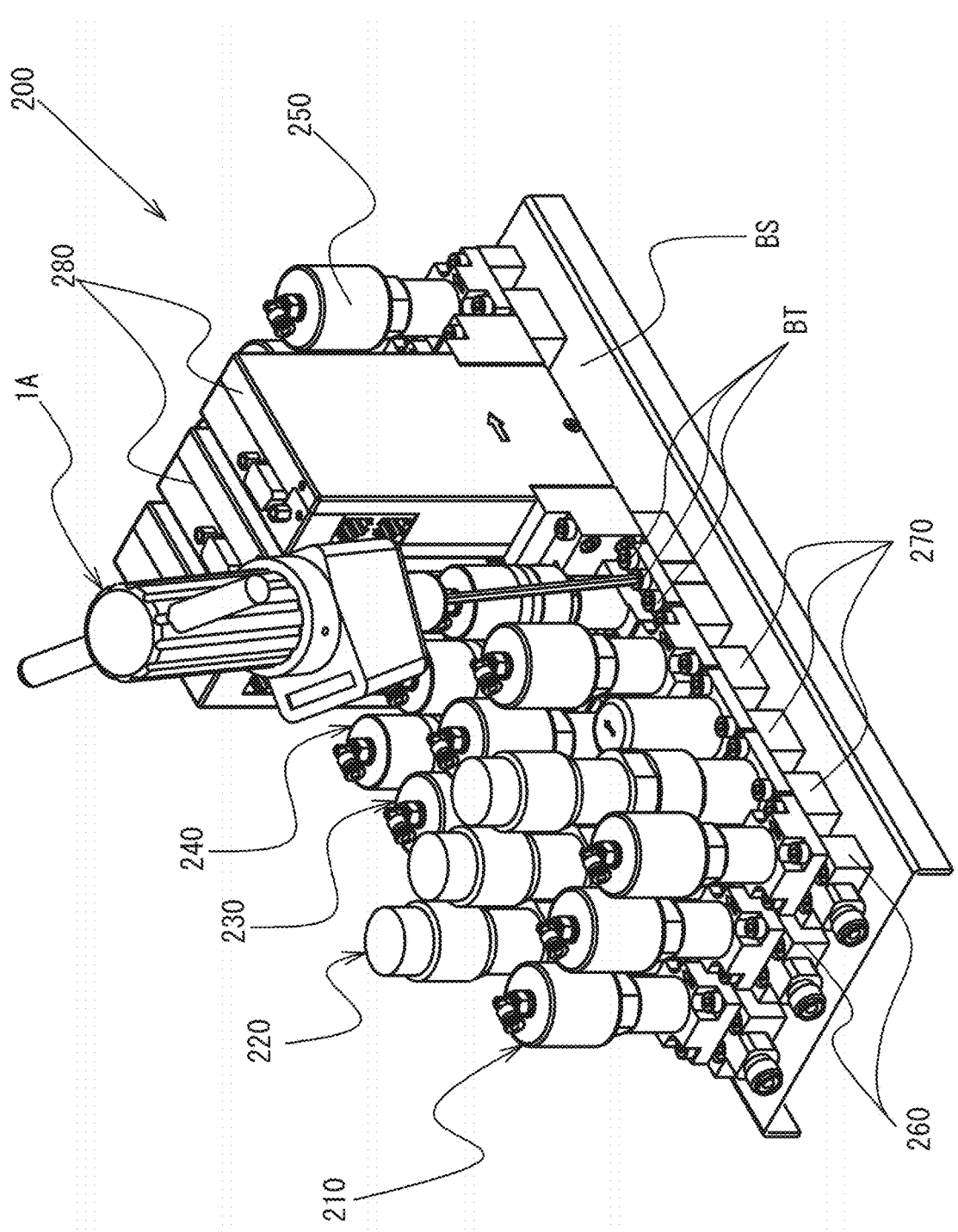
[fig.8A]

[fig.8B]
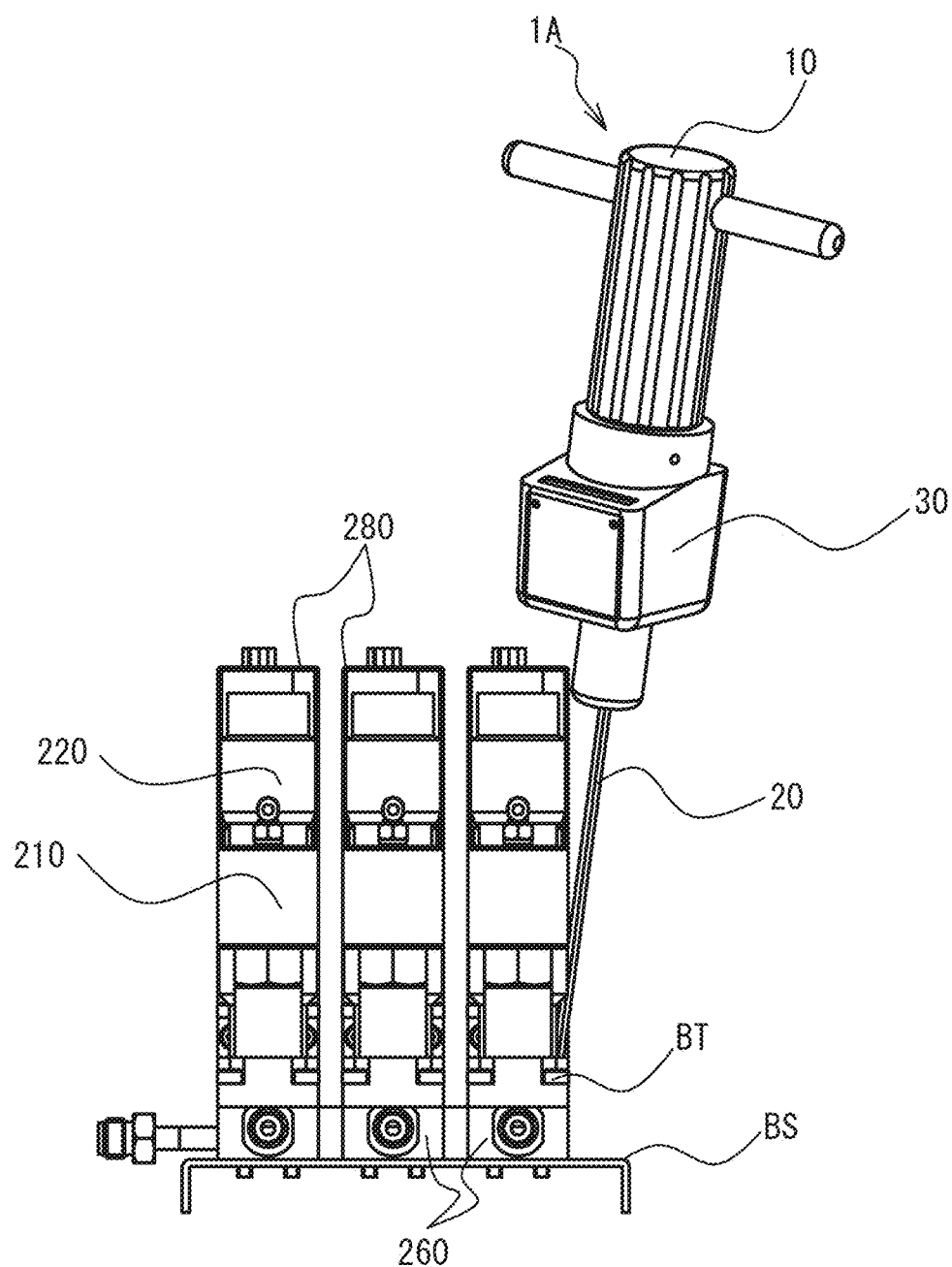

[fig.9A]
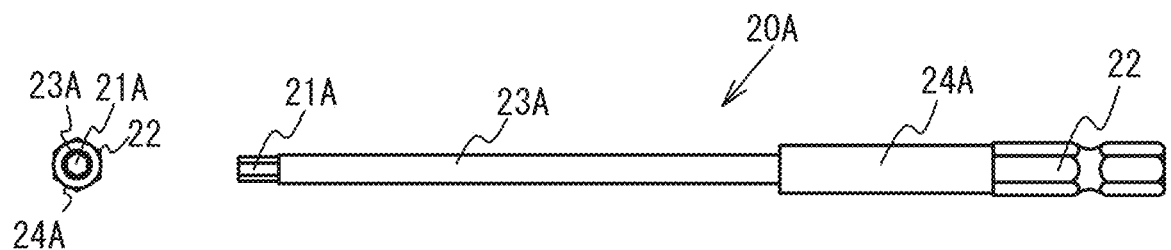
[fig.9B]
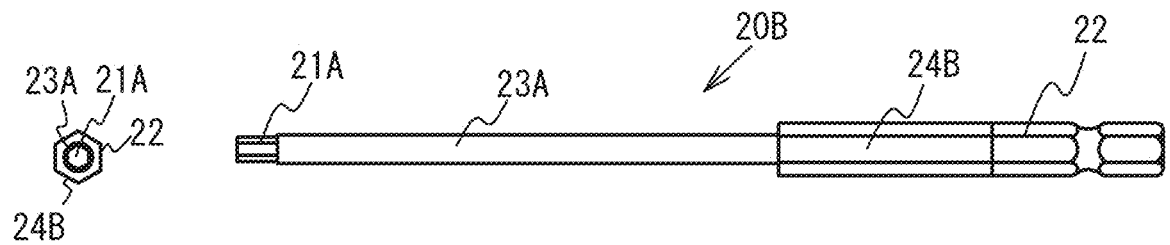
[fig.9C]
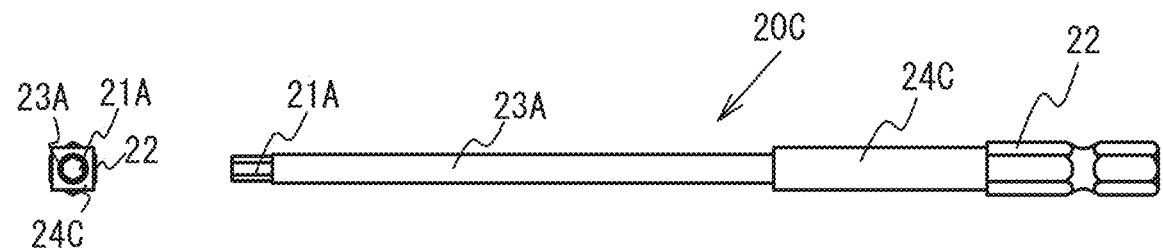
[fig.9D]
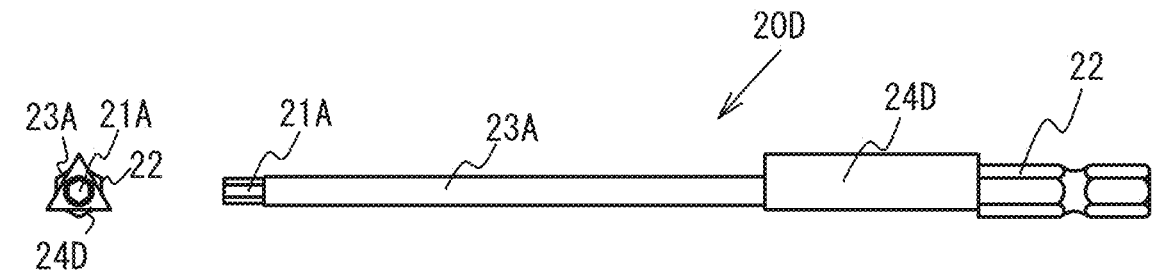

[fig.9E]
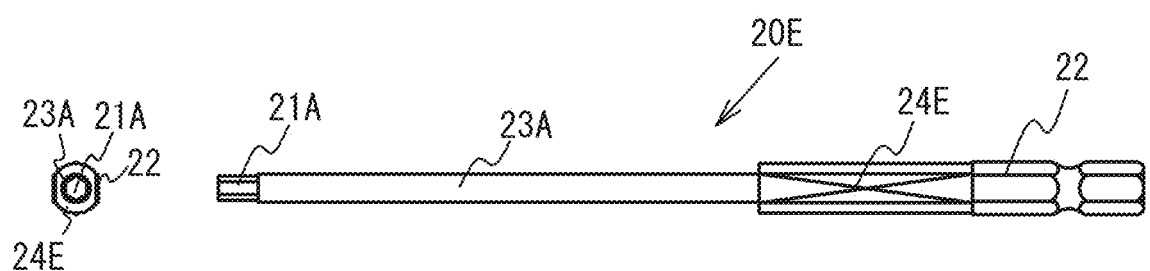
[fig.9F]
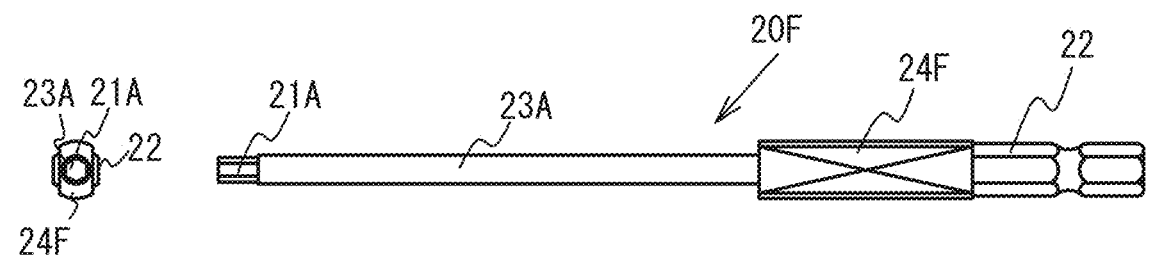
[fig.9G]
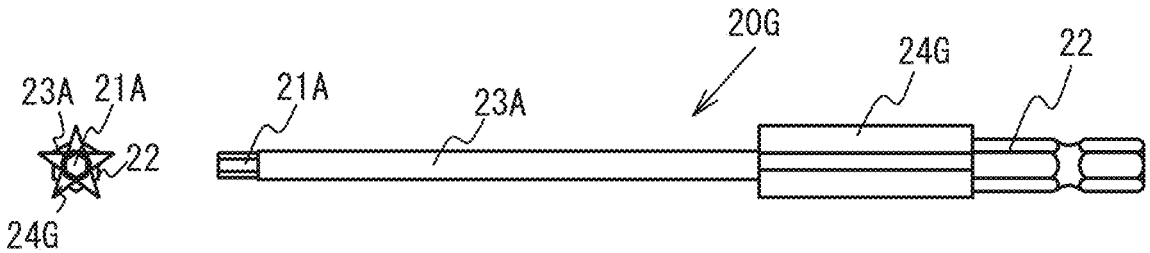

[fig.10]
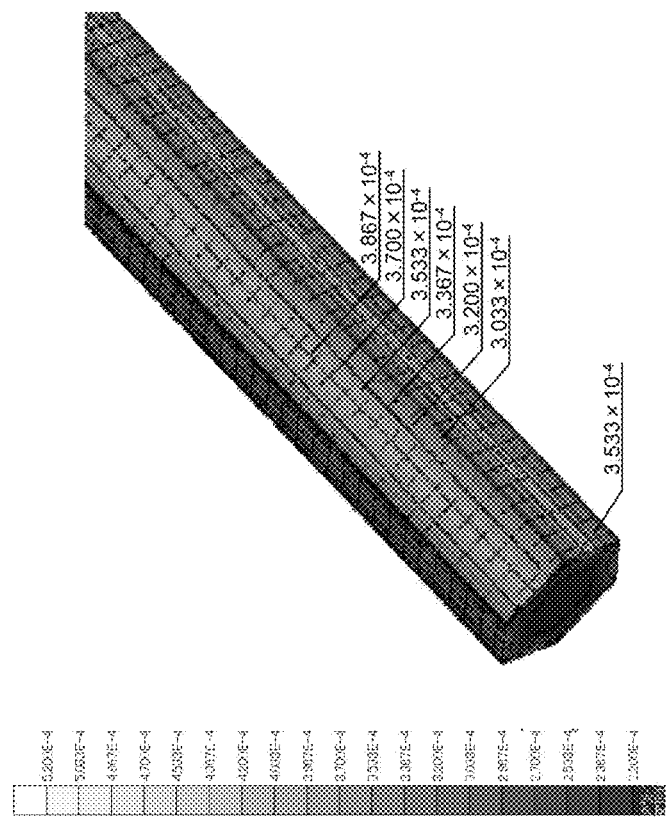

[fig. 11]
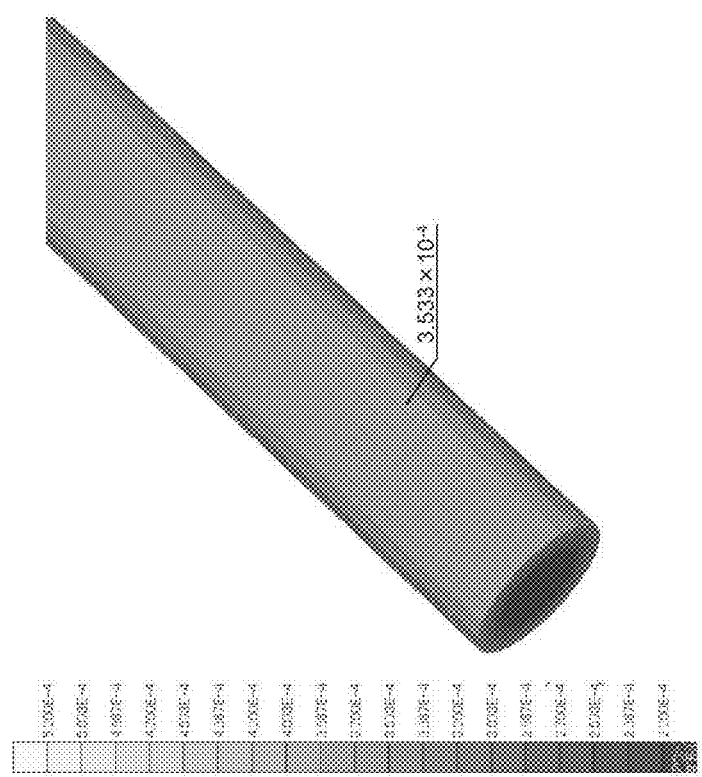

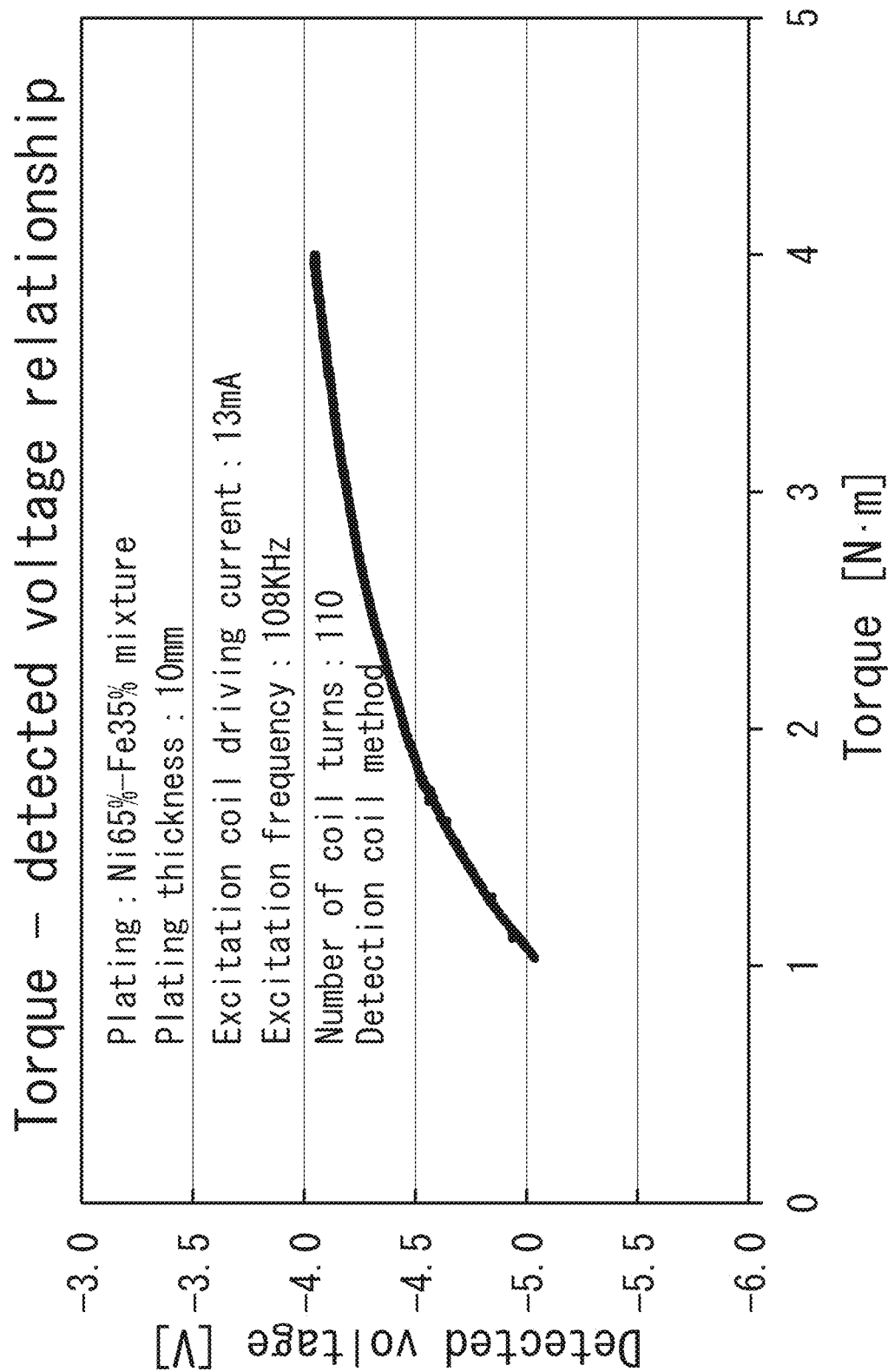

[fig.13]
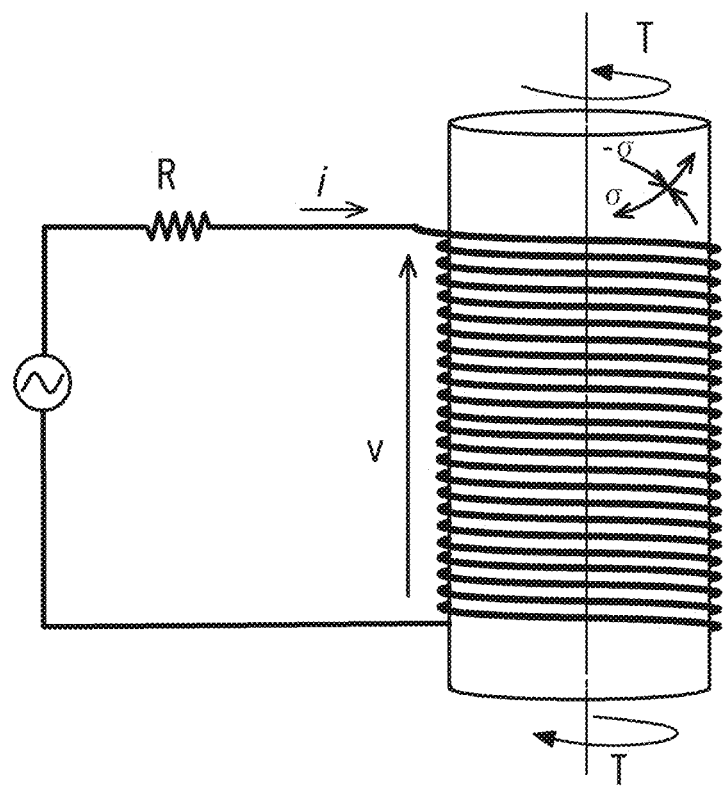

[fig.14]
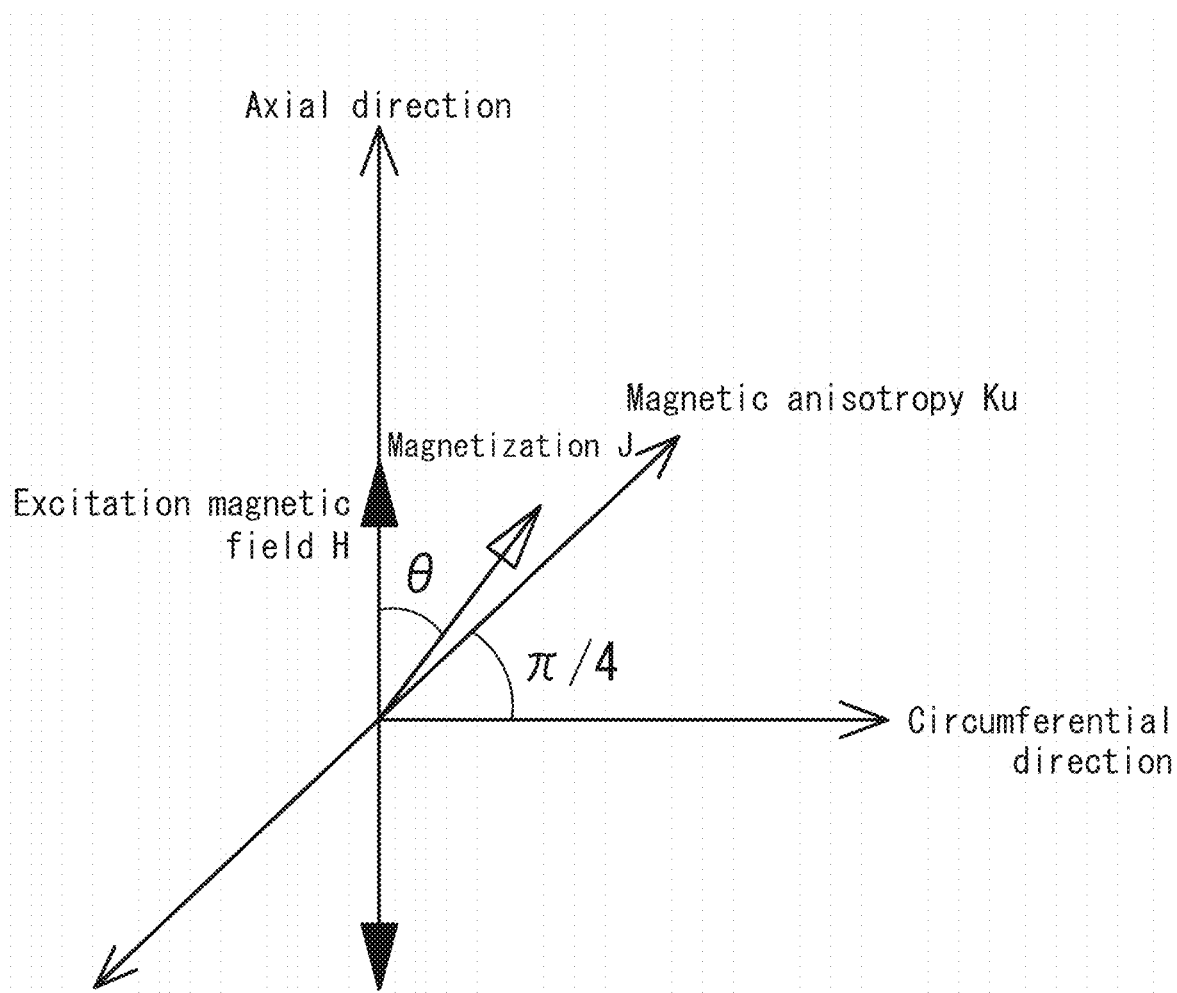

[fig.15]
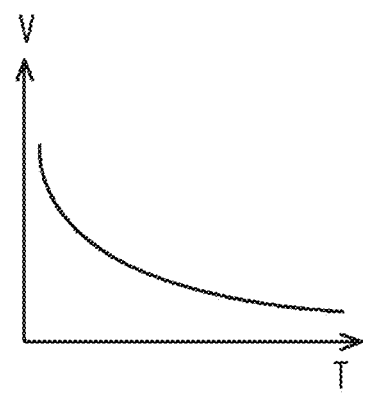

[fig.16]
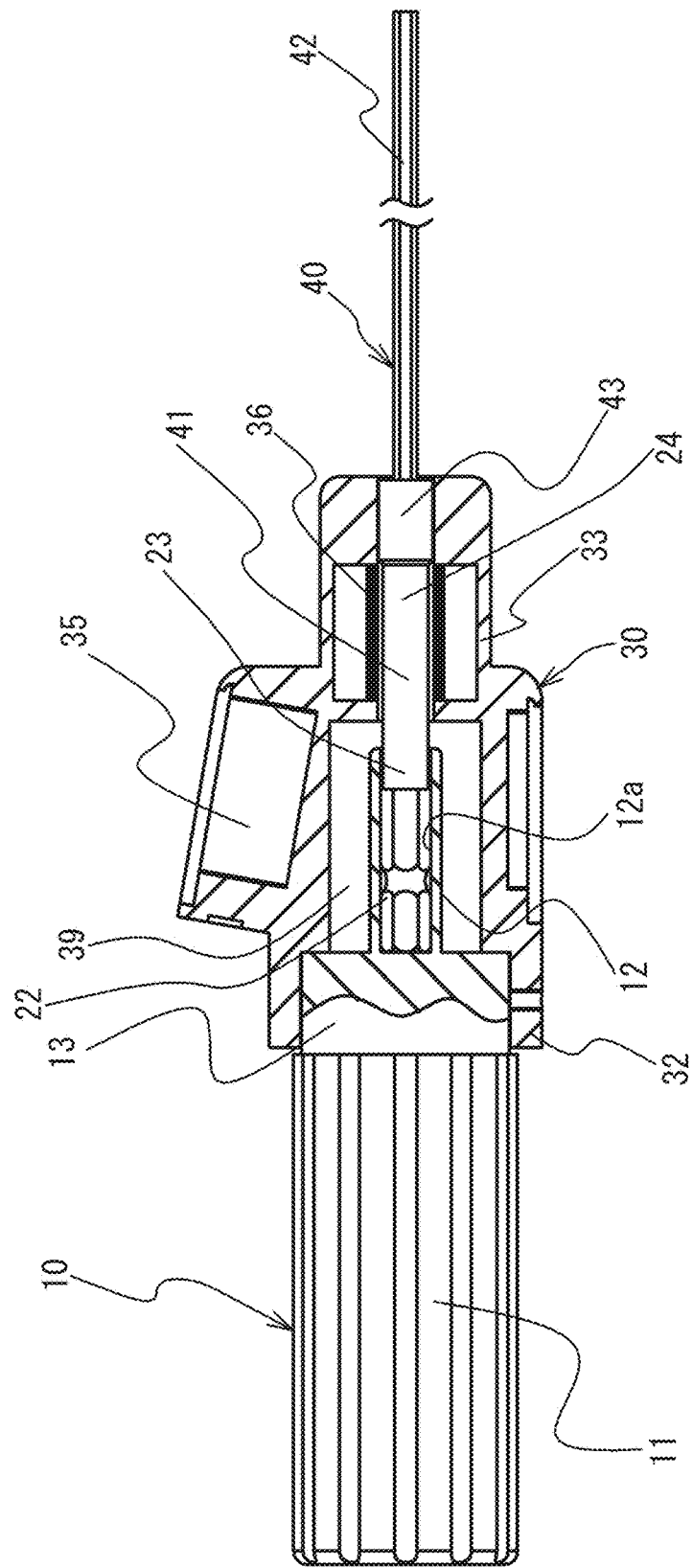

MANUAL TOOL, AND BIT AND TORQUE SENSOR USED THEREFOR

FIELD OF THE INVENTION

The present invention relates to a manual tool with a torque sensor, and a bit and a torque sensor used therefor.

DESCRIPTION OF THE BACKGROUND ART

In various manufacturing processes such as a semiconductor manufacturing process, a fluid control system (for example, refer to Patent Document 1) in which various fluid devices, such as a switch valve, a regulator, and a mass flow controller, are integrated is used to supply an accurately measured process gas to a process chamber.

In an assembly process of a fluid control system such as described above, a large number of tightening operations of bolts, such as hexagonal socket bolts, are required while high assembly quality is demanded.

PATENT DOCUMENTS

Patent Document 1: Japanese Laid-Open Patent Application No. 2016-050635 Patent Document 2: Japanese Laid-Open Patent Application No. 2012-86284

SUMMARY OF THE INVENTION

Problems to be Solved by the Invention

Torque management of a tightening operation is indispensable to maintaining and managing assembly quality and, for electric or fluid driven-type automatic tools, a large number of tools capable of precise torque management have been proposed (for example, refer to Patent Document 2).

Nevertheless, in the related art, a manual tool suitable for a bolt tightening operation or the like performed manually using a driver, a wrench, or the like, capable of precise torque management, and excellent in workability and operability does not exist.

An object of the present invention is to provide a manual tool excellent in workability and operability and capable of precise tightening torque management.

Another object of the present invention is to provide a bit and a torque sensor suitable for the manual tool described above.

Means for Solving the Problems

A manual tool according to the present invention comprises a grip including a bit holding part that detachably holds a bit, and a torque sensor that is of a magnetostrictive type, and includes a detecting part that is penetrated by the bit held by the bit holding part and surrounds an outer periphery of the bit, the torque sensor being capable of contactlessly detecting a torque acting on the bit, and detachably provided to the grip.

Preferably, a configuration can be adopted in which the torque sensor is formed so as to be mountable to the grip with the bit mounted to the bit holding part of the grip.

Preferably, a configuration can be adopted in which the bit includes a tip end portion capable of engaging with a fastening member, a base end portion mounted to the bit holding part, and a shaft part extending between the tip end portion and the base end portion, and a sensor part of the torque sensor contactlessly detects a torque acting on the bit using a portion of the shaft part of the bit as a monitored part.

More preferably, a configuration can be adopted in which the cross section of the monitored part of the shaft part of the bit is formed into a polygonal shape.

More preferably, a configuration can be adopted in which the monitored part is formed to have a cross-sectional area greater than a cross-sectional area of the shaft part other than the monitored part.

In this case, the diameter of a circle inscribed in a cross section of the monitored part of the bit may be 10 mm or less.

The present invention may be applied to a manual tool having a maximum tightening torque capable of tightening the fastening member of 10 N·m or less.

A bit of the present invention is a bit used in the manual tool having the above-described configuration, and comprises a tip end portion partially formed of a magnetostrictive material and capable of engaging with a fastening member, a base end portion mounted to the bit holding part, and a shaft part extending between the tip end portion and the base end portion.

A torque sensor of the present invention is a torque sensor used in the manual tool having the above-described configuration, and comprises a detecting part formed so as to be penetrable by the bit, and a mounting part detachably mounted to the grip.

Effect of the Invention

According to the present invention, it is possible to obtain a manual tool excellent in workability and operability and capable of precise tightening torque management.

BRIEF DESCRIPTION OF THE DRAWINGS

FIG. 1 is an external perspective view of a manual tool according to an embodiment of the present invention.

FIG. 2 is a perspective view of a grip.

FIG. 3 is a perspective view of a bit.

FIG. 4 is a perspective view of a torque sensor.

FIG. 5 is a front view including a cross section of a portion of the manual tool in FIG. 1.

FIG. 6 is a functional block diagram illustrating a configuration example of an electric system of the torque sensor.

FIG. 7 is a drawing illustrating a modification of the grip.

FIG. 8A is a perspective view illustrating a usage example of the manual tool according to an embodiment of the present invention.

FIG. 8B is a front view of a fluid control system and the manual tool in FIG. 8A.

FIG. 9A is a drawing illustrating another example (round type) of the bit.

FIG. 9B is a drawing illustrating another example (hexagonal type) of the bit.

FIG. 9C is a drawing illustrating another example (quadrilateral type) of the bit.

FIG. 9D is a drawing illustrating another example (triangular type) of the bit.

FIG. 9E is a drawing illustrating another example (two-surface divided type) of the bit.

FIG. 9F is a drawing illustrating another example (two-surface divided type) of the bit.

FIG. 9G is a drawing illustrating another example (star-shaped type) of the bit.

FIG. 10 is a diagram showing simulation results of strain produced when torque is applied to a hexagonal-type bit.

FIG. 11 is a diagram showing simulation results of strain produced when torque is applied to a round-type bit.

FIG. 12 is a graph showing an example of a relationship between a torque of the torque sensor and a detected voltage according to the present embodiment.

FIG. 13 is an explanatory view of an operating principle of the torque sensor.

FIG. 14 is a diagram explaining an effect of magnetic anisotropy on magnetization of a magnetostrictive film FIG. 15 is a relationship diagram between voltage and torque.

FIG. 16 is a front view including a cross section of a portion of the manual tool according to another embodiment.

DESCRIPTION OF THE PREFERRED EMBODIMENTS

Embodiments of the present invention are described below with reference to the drawings. It should be noted that, in this specification and the drawings, components having substantially the same function are denoted using the same reference numeral, and duplicate descriptions thereof are omitted.

First Embodiment

FIG. 1 to FIG. 5 illustrate a structure of a driver 1 serving as a manual tool according to the first embodiment.

The driver 1 includes a grip 10, a bit 20, and a torque sensor 30. The driver 1 is used to fasten a hexagonal socket bolt (fastening member) and is used within a range of a maximum tightening torque of 10 N·m or less, but is not limited thereto.

The fastening member used is a hexagonal socket bolt, a hexagon head bolt, a cross-recessed screw, or the like, but is not limited thereto.

The grip 10, as illustrated in FIG. 2, is a columnar member composed of a material such as a resin, and includes a main body part 11 with a plurality of non-slip grooves formed on an outer peripheral surface thereof, a bit holding part 12 having a cylindrical shape and formed on a tip end portion, and a sensor mounting part 13 that is formed between the main body part 11 and the bit holding part 12 and detachably mounts the torque sensor 30. A holding hole 12a that is a blind hole having a regular hexagonal cross section is formed in the bit holding part 12, and the bit 20 is inserted into and held by this holding hole 12a.

The bit 20, as illustrated in FIG. 3, includes a base end portion 22 that has a regular hexagonal cross section and is inserted into and held by the bit holding part 12 of the grip 10 described above, a tip end portion 21 opposite to the base end portion 22, and a shaft part 23 extending between the base end portion 22 and the tip end portion 21. The hexagonal cross sections of the tip end portion 21 and the shaft part 23 are formed to have the same dimensions. Cross-sectional areas of the tip end portion 21 and the shaft part 23 are smaller than that of the base end portion 22. The tip end portion 21 engages with the hexagonal hole of the hexagonal socket bolt. As described later, a portion of the shaft part 23 near the base end portion 22 is a monitored part 24 to be detected by the torque sensor 30.

The bit 20 is specifically formed of an alloy steel such as a carbon steel, nickel-chromium-molybdenum steel, and chromium-vanadium steel.

The monitored part 24 is formed of a magnetostrictive material, and is plated with, for example, Ni (40%)-Fe (60%) in order to increase detection sensitivity.

With respect to the dimensions of the bit 20, for example, a diameter of a circle inscribed in a cross section of the base end portion 22 is 10 mm or less, a diameter of a circle inscribed in a cross section of the shaft part 23 is about 4 mm, and a total length is about 200 mm, but these dimensions are not limited thereto and are appropriately selected in consideration of workability and operability.

In the bit 20, the shaft part 23 and the monitored part 24 may be formed integrally or may be divided.

The torque sensor 30, as illustrated in FIG. 4 and FIG. 5, includes a case part 31, a mounting part 32, a detecting part 33, and a circuit housing part 35.

The detecting part 33 includes a through-hole 33a formed in a central portion thereof, and the bit 20 penetrates through this through-hole 33a. In an interior of the detecting part 33, a coil holding part 33b having a cylindrical shape is formed so as to define a portion of the through-hole 33a, and a coil 36 for excitation and detection is provided on an outer peripheral surface of the coil holding part 33b. An outer periphery of the monitored part 24 of the bit 20 penetrating the detecting part 33 is surrounded by the coil 36.

The case part 31, the mounting part 32, and the detecting part 33 are integrally formed of a resin material, and a cavity 39 is formed in an interior of the case part 31. The cavity 39 is capable of housing the bit holding part 12 of the grip 10 through the mounting part 32.

The mounting part 32 formed into a cylindrical shape is fitted with the sensor mounting part 13 of the grip 10 at an inner periphery thereof, and fixed to the sensor mounting part 13 by a screw member (not illustrated).

The circuit housing part 35 houses hardware configured by a microprocessor, a memory, a battery, an external input/output circuit, a communication circuit, various circuits for torque detection, and the like, and operates according to required software stored in the memory.

The driver 1, as illustrated in FIG. 5, allows the torque sensor 30 to be attached after the bit 20 is mounted to the grip 10. Thus, given that the grip 10 and the bit 20 are general-purpose tools conventionally used, by post-attachment of the torque sensor 30, it is possible to detect the torque acting on the bit 20 without impairing the workability or operability of the tools.

It should be noted that while this embodiment illustrates a case where the torque sensor 30 can be post-attached, a configuration in which the torque sensor 30 is attached to the grip 10 in advance and the bit 20 is subsequently mounted to the grip 10 can also be adopted.

FIG. 6 is a functional block diagram illustrating an example of an electric system of the torque sensor 30.

In the present invention, while the coil 36 may be one coil, two coils, namely an excitation coil 36a and a detection coil 36b, may be used.

In this embodiment, a case of the two coils of the excitation coil and the detection coil will be described.

The electric system of the torque sensor 30 includes an oscillation circuit 110, a buffer amplifier 120, a phase adjusting circuit 130, a voltage to current (V-I) converter 140, an inverter 160, a synchronization detecting circuit 170, and an inverting amplifier 180.

(Excitation Side)

The oscillation circuit 110 generates a reference frequency signal (100 kHz) that excites the excitation coil 36a.

A signal is output from the oscillation circuit 110 to the excitation-side circuit as a sine wave, but is output to the phase adjusting circuit 130 via the buffer amplifier 120 in order to stably operate the oscillation circuit 110.

The phase adjusting circuit 130 adjusts the phase of a waveform and outputs the result to the V-I converter 140.

The V-I converter 140 converts an input voltage into current and outputs the current to the excitation coil 36.

(Detection Side)

The detection coil 36b outputs an induced voltage produced by a reverse magnetostrictive effect to the synchronization detecting circuit 170.

A square wave is output from the oscillation circuit 110 to the detection side as a reference signal. A frequency of this square wave is the same as that of the sine wave output to the excitation side. The output square wave is branched into two, one of which is output to the synchronization detecting circuit 170 as is, and the other of which is inverted in phase by the inverter 160 and output to the synchronization detecting circuit 170.

The synchronization detecting circuit 170 synchronously detects the induced voltage from the detection coil 36b with reference to the reference signal and outputs the induced voltage to the inverting amplifier 180.

The inverting amplifier 180 averages the output from the synchronization detecting circuit 170, performs offset adjustment and gain adjustment, and outputs the result as a torque signal SG. The torque signal SG is stored in a memory (not illustrated) or transmitted to the outside as a wireless signal through a communication circuit.

It should be noted that, in this embodiment, the phase adjusting circuit 130 is installed downstream of the buffer amplifier 120 and upstream of the V-I converter 140, but may be installed between the detection coil 36b and the synchronization detecting circuit 170.

As described above, in the torque sensor 30, a change in the torque acting on the monitored part of the bit 20 is detected by the coil 36 as a change in a magnetic permeability of the magnetostrictive material forming the bit 20.

FIG. 7 illustrates a modification of the grip 10.

A driver 1A illustrated in FIG. 7 includes an auxiliary bar 50 provided orthogonal to the grip 10.

By providing the auxiliary bar 50 to the grip 10, it is possible to manually generate a larger tightening and loosening torque.

Here, a working example using the driver 1A will be described with reference to FIG. 8A and FIG. 8B.

A fluid control system 200 illustrated in FIGS. 8A and 8B is used for supplying various gases to a reactor such as a semiconductor manufacturing system and, on a base sheet metal BS, a plurality (three rows) of fluid control assemblies configured by various fluid devices 210, 220, 230, 240, 280, 250 composed of automatic valves and mass flow controllers respectively disposed in a longitudinal direction are arranged in parallel.

A plurality of joint blocks 260, 270 provided on the base sheet metal BS include flow paths that connect the various fluid devices. Bodies of the fluid devices and the joint blocks 260, 270 are coupled by hexagonal socket bolts BT.

The driver 1A is used for a tightening operation of the hexagonal socket bolt BT. When various fluid devices are integrated and the hexagonal socket bolt BT is tightened, the driver 1A may tighten the hexagonal socket bolt BT while inclined so that the bit of the driver 1A does not interfere with the fluid devices. Such an operation is not easy to implement by an accurate tightening torque for a large number of hexagonal socket bolts BT.

According to this embodiment, because a power feeder line is not connected to the driver 1A and the minimized torque sensor 30 is post-attached to a base portion of the bit, the workability and the operability of a bolt tightening operation such as described above is ensured. In addition, because the tightening torque can be detected in real time during the tightening operation, it is possible to perform the assembly operation of the system with an accurate tightening torque.

Second Embodiment

FIG. 9A to FIG. 9G are drawings illustrating other embodiments of the bit.

In bits 20A to 20G illustrated in FIG. 9A to FIG. 9G, a tip end portion 21A has a regular hexagonal cross section, and a diameter of the inscribed circle is 3 mm.

A shaft part 23A is a round bar having a diameter of 4 mm. Cross-sectional shapes of monitored parts 24A to 24G positioned in a base portion of the shaft part 23A are each different from that of the shaft part 23A. The important points are that (1) cross-sectional areas of the monitored parts 24A to 24G are further enlarged than a cross-sectional area of the shaft part 23A, and (2) cross-sectional shapes of the monitored parts 24B to 24G of the bits 20B to 20G are non-circular.

The monitored part 24A in FIG. 9A is a round type having a diameter (10 mm) larger than that of the shaft part 23A.

The monitored part 24B in FIG. 9B is a regular hexagonal type (with an inscribed circle of 10 mm).

The monitored part 24C in FIG. 9C is a quadrilateral (square) type.

The monitored part 24D in FIG. 9D is an equilateral triangular type.

The monitored part 24E in FIG. 9E is a two-surface divided type (with an outer diameter of 7 mm).

The monitored part 24F in FIG. 9F is a two-surface divided type (with an outer diameter of 8 mm).

The monitored part 24G in FIG. 9G is a star shape.

To measure the torque with which the fastening member is tightened by the bit, the torque acting on the bit need only be detected.

While the reverse magnetostrictive effect is utilized to detect the torque acting on the bit, it is necessary to convert a change in magnetic permeability of a shaft (monitored part) surface due to the applied torque into an impedance change of a solenoid coil wound around the shaft (monitored part), and detect the torque as an unbalanced voltage of a bridge circuit.

A relationship between a stress (strain) acting on the surface of the shaft (monitored part) and the diameter of the shaft (monitored part) is expressed by the following equation.

$$\sigma = 16T/(\pi/D^3)$$

Here, $\sigma$ is the stress (strain) on the surface of the shaft (monitored part), T is the torque acting on the shaft (monitored part), and D is the diameter of the shaft (monitored part).

That is, when the same torque is applied to bits having different diameters of the shaft (monitored part), the stress (strain) on the surface of the shaft (monitored part) increases significantly for bits having a smaller diameter of the shaft (monitored part).

The stress (strain) on the surface of the shaft (monitored part) changes the magnetic permeability of the surface of the shaft (monitored part).

While a change in magnetic permeability occurs by orientations of micromagnets configured on an atomic scale changing in response to a force from the outside, a change no longer occurs (saturated state) when the orientations of the micromagnets are completely aligned.

To precisely detect the torque applied to the bit (shaft), the change in magnetic permeability is preferably linear within a range of the applied torque.

The stress (strain) that completely aligns the orientations of the micromagnets on a surface layer of the shaft (monitored part) is constant, and therefore, when an attempt is made to apply the same torque, the smaller the diameter of the shaft (monitored part), the more likely the change in magnetic permeability disappears (becomes saturated) before reaching the required torque to be applied.

With a typically used φ4 bit, the voltage change according to the torque of the magnetostrictive torque sensor quickly becomes saturated. For example, when an attempt is made to tighten a fastening member to a torque of 3 N·m using a typically used φ4 bit (diameter of the monitored part: 4 mm), output (voltage) from the torque sensor becomes constant before the torque reaches 3 N·m.

Thus, the cross-sectional areas of the monitored parts 24A to 24G are further enlarged than the shaft part 23A.

When an attempt is made to apply the same torque, the stress (strain) on the shaft surface decreases as the diameter of the shaft (monitored part) increases. Therefore, even when the torque has been fully applied, it is possible to make the orientations of the micromagnets on the surface layer of the shaft (monitored part) not be completely aligned. In such a state, the change in magnetic permeability is linear within the range of the applied torque.

However, as understood from FIG. 8A and FIG. 8B, because spacing between various fluid devices on the fluid control system 200 is not wide, there is a limit to the enlargement of the outer diameter of the bit (monitored part).

Thus, the cross-sectional shapes of the monitored parts 24B to 24G of the bits 20B to 20G illustrated in FIG. 9B to FIG. 9G are non-circular. With this configuration, the saturation of the output from the torque sensor can be further delayed. This is because the magnitude of the stress (strain) on the shaft surface depends on the diameter, and therefore the stress (strain) can be distributed by making the shape non-circular even with the same cross-sectional area.

Simulation

Here, FIG. 10 shows simulation results of strain produced when torque is applied to a bit.

FIG. 10 is a diagram showing strain generated in a hexagonal-type bit. Further, as a comparative example, FIG. 11 shows strain generated in a round-type bit. A cross-sectional area of the round-type bit in FIG. 11 is the same as a cross-sectional area of the hexagonal-type bit in FIG. 10.

The simulation conditions are as follows.
Boundary condition
Tightening torque: 3N·m
Material characteristics
SNCM439
Longitudinal elastic modulus: 207 GPa
Poisson's ratio: 0.3
0.2% proof stress: 980 MPa
Tensile strength: 1720 MPa
Maximum elongation: 0.6
Density (t/mm$^3$): 7.89×10$^{-9}$
Application area: Body
Constraint conditions: Rigid contact surface, hexagonal hole inserting part
Friction coefficient: SUS/SUS surface, μ=0.3

As understood from FIG. 10, on the surface of the hexagonal-type bit, the amount of strain gradually increases from an edge portion toward a center portion of a flat surface part, and stress distribution is formed in the flat surface part.

On the other hand, as shown in FIG. 11, on the surface of the round-type bit, stress is formed uniformly, and the amount of strain is larger than that of the edge portion of the hexagonal-type bit.

FIG. 12 shows an example of a relationship between a torque of the torque sensor and a detected voltage according to the present embodiment.

It should be noted that the monitored part of the bit has a hexagonal shape in which a spacing between two parallel surfaces is 6.35 mm (¼ inch).

Here, a supplementary explanation is given on the operating principle of the torque sensor.

For example, FIG. 13 illustrates a case in which a solenoid coil is disposed surrounding a shaft plated with a permalloy magnetostrictive film having a 65% Ni and 35% Fe composition. The solenoid coil is, for example, a copper wire having a diameter of 0.2 to 0.3 mm and 140 turns. A current i is supplied from an alternating current (AC) excitation power supply via a resistance R. Given L as an inductance of the coil, a voltage proportional to coil impedance, namely i×(R+jωL), is produced between both ends of the coil. Here, ω indicates an angular frequency of the AC excitation current and j indicates an imaginary unit. When a shaft torque (twisting force) T is applied as illustrated in FIG. 13, a principal stress σ in a 45° direction and −σ in a −45° direction relative to an axial direction are produced as a pair on the surface of the shaft. Then, this stress is transmitted to the magnetostrictive film plated on the shaft.

Given D[m] as an outer diameter of the shaft and T[N·m] as a torque, the principal stress σ[N/m$^2$] is found by the following formula. Here, a thickness of the magnetostrictive film is sufficiently smaller than D, and a reaction force against the twist can be ignored.

[Formula 1]

$$\sigma = \frac{16T}{\pi D^3} \quad (1)$$

Accordingly, magnetic anisotropy (given as Ku) is induced in the magnetostrictive film. Given λs (assuming λs>0 for simplicity) as a saturated magnetostriction constant of the magnetostrictive film, Ku appears in a positive principal stress direction as shown in FIG. 14. This magnitude is given by the following formula.

[Formula 2]

$$K_u = 2\frac{3}{2}\lambda_s \frac{16T}{\pi D^3} = \frac{48\lambda_s T}{\pi D^3} \quad (2)$$

In Formula (2), while it is assumed that an elastic moduli of the shaft material and the magnetostrictive film are the same, when the difference between the two elastic moduli is considered, Formula (2) need only be multiplied by a ratio expressed by (Transverse elastic modulus of magnetostrictive film)/(Transverse elastic modulus of shaft material).

An effect of a magnetic anisotropy Ku on a magnetization J (volume average of micromagnets) of the magnetostrictive film is that the direction of J is kept in the direction of Ku.

On the other hand, an excitation magnetic field H tends to attract the magnetization J in that direction. The sum of the cross-sectional area of the magnetostrictive film and the number of turns of the coil multiplied by a time variation of $J \cos \theta$ is the induced voltage of the coil. (H is an alternating magnetic field and thus θ fluctuates in magnitude at that frequency.) A fluctuation width of θ in FIG. 14 decreases as Ku increases, and increases as Ku decreases. That is, the fluctuation width of θ decreases and the induced voltage of the coil decreases when the torque T increases, and the reverse is true when the torque T decreases.

An output voltage v obtained by amplifying the induced voltage as necessary and performing synchronous detection monotonously decreases relative to the torque T as shown in FIG. 15.

From this, the torque T can be detected from the change in the voltage v. At this time, if an outer diameter D of the shaft is large, this curve becomes more linear, and a torque sensor having a large dynamic range can be obtained.

While one coil is used in FIG. 13, it is also possible to apply a second coil in the same manner as the first coil, and obtain the output voltage from the second coil. In this way, a voltage drop irrelevant to the torque produced in the resistance portion of the first coil can be eliminated, and detection can be performed with higher accuracy. Further, by adjusting the number of turns of the first coil, it is possible to adjust the necessary excitation current i, thereby facilitating a design that reduces power loss.

Third Embodiment

FIG. 16 illustrates another embodiment of the bit. It should be noted that, in FIG. 16, the same parts as those in FIG. 5 are denoted using the same reference numerals, and descriptions thereof are omitted.

A bit 40 is configured by combining an extension bar 41 and a replacement bit 42. The extension bar 41 includes a second bit holding part 43 on a tip end side thereof, and the replacement bit 42 is replaceably held by the second bit holding part 43. Similar to the bit holding part 12, the second bit holding part 43 has a socket structure of a regular hexagonal cross section.

A portion of the shaft part 23 of the extension bar 41 is the monitored part 24 in which a torque is detected by the torque sensor 30.

The value detected by the torque sensor 30 is affected by a surface treating state, such as a type and a thickness of the plating and therefore, when the structure of the monitored part 24 changes by replacement of a bit or the like, the torque value is preferably recalibrated.

By making the structure one in which the extension bar 41 and the replacement bit 42 can be divided, it is possible to replace only the replacement bit 42 without affecting the monitored part 24, and perform bit replacement in a short period of time. Further, because there is no restriction on the material or the surface treatment for the bit used as the replacement bit 42, a general-purpose bit can be used, which reduces bit replacement costs and facilitates handling of special screws that require a tip shape other than a hexagon.

DESCRIPTIONS OF REFERENCE NUMERALS 1, 1A Driver
10 Grip
11 Main body part
12 Bit holding part
12a Holding hole
13 Sensor mounting part
20, 20A to 20G Bit
21, 21A Tip end portion
22 Base end portion
23, 23A Shaft part
24, 24A to 24G Monitored part
30 Torque sensor
31 Case part
32 Mounting part
33 Detecting part
33a Through-hole
33b Coil holding part
35 Circuit housing part
36 Coil
36a Excitation coil
36b Detection coil
39 Cavity
40 Bit
41 Extension bar
42 Replacement bit
43 Second bit holding part
50 Auxiliary bar
110 Oscillation circuit
120 Buffer amplifier
130 Phase adjusting circuit
140 V-I converter
160 Inverter
170 Synchronization detecting circuit
180 Inverting amplifier
200 Fluid control system
210 to 250, 280 Fluid device
260, 270 Joint block
BS Base plate metal
BT Hexagonal socket bolt
D Outer diameter
H One-way excitation magnetic field
J Magnetization
Ku Magnetic anisotropy
R Resistance
SG Torque signal
T Torque
i Current
v Voltage
σ Principal stress

What is claimed is:

1. A manual tool, comprising:
a bit including:
   a base end portion, a tip end portion capable of engaging with a fastening member, and a shaft part that is solid and extends between the tip end portion and the base end portion, the shaft part having a monitored part, and a magnetostrictive material provided on a circumference of the monitored part;
a grip including a bit holding part that detachably holds the base end portion of the bit; and
a torque sensor that is of a magnetostrictive type, and includes a detecting part that is penetrated by the bit held by the bit holding part and surrounds an outer periphery of the monitored part of the bit with a gap, and the torque sensor includes a mounting part that is to be mounted on the grip, the torque sensor being capable of contactlessly detecting a torque acting on the bit, and detachably provided to the grip, wherein
the torque sensor is provided on the grip so as to surround an outer periphery of the bit-holding part, and the bit mounted on the bit-holding part extends though the torque sensor and the detecting part to the outside of the torque sensor.

2. The manual tool according to claim 1, wherein the torque sensor is formed so as to be mountable to the grip with the bit mounted to the bit holding part.

3. The manual tool according to claim 1, wherein the cross section of the monitored part of the bit is formed into a polygonal shape.

4. The manual tool according to claim 3, wherein the monitored part is formed to have a cross-sectional area greater than or equal to a cross-sectional area of the shaft part other than the monitored part.

5. The manual tool according to claim 1, wherein the diameter of a circle inscribed in a cross section of the monitored part of the bit is 10 mm or less.

6. The manual tool according to claim 1, wherein the bit is composed of an extension bar and a replacement bit, the extension bar includes the base end portion and the shaft part, and the replacement bit includes the tip end portion.

7. The manual tool according to claim 1, wherein a maximum tightening torque capable of tightening the fastening member is 10 N·m or less.

8. The manual tool according to claim 1, wherein the torque sensor includes a processing circuit that processes a detection signal detected by the detecting part.

9. The manual tool according to claim 1, wherein the detecting part includes a solenoid coil formed so as to be penetrable by the bit.

* * * * *